(12) United States Patent
Forwerck

(10) Patent No.: US 12,392,677 B2
(45) Date of Patent: Aug. 19, 2025

(54) HOOK AND SNAP PRESSURE SENSOR ASSEMBLY

(71) Applicant: VEONEER US SAFETY SYSTEMS, LLC

(72) Inventor: Joshua Forwerck, Royal Oak, MI (US)

(73) Assignee: VEONEER US SAFETY SYSTEMS, LLC, Southfield, MI (US)

( * ) Notice: Subject to any disclaimer, the term of this patent is extended or adjusted under 35 U.S.C. 154(b) by 165 days.

(21) Appl. No.: 17/980,319

(22) Filed: Nov. 3, 2022

(65) Prior Publication Data

US 2024/0151602 A1 May 9, 2024

(51) Int. Cl.
*B60R 21/013* (2006.01)
*G01L 19/00* (2006.01)
*G01L 19/06* (2006.01)
*G01L 19/14* (2006.01)

(52) U.S. Cl.
CPC ...... *G01L 19/0038* (2013.01); *G01L 19/0672* (2013.01); *G01L 19/147* (2013.01)

(58) Field of Classification Search
CPC ............. G01L 19/0038; G01L 19/0672; G01L 19/147; G01L 19/144; G01L 19/143; G01L 19/003; B60R 21/013; B60R 2021/01006; G01D 11/245
USPC .................. 73/714, 715, 723–728, 756, 431; 280/728.1; 340/626, 425.5, 429, 436, 340/463, 467; 180/271, 274, 283
See application file for complete search history.

(56) References Cited

U.S. PATENT DOCUMENTS

| 11,209,295 B2 | 12/2021 | Pusheck |
| 2005/0078010 A1 | 4/2005 | Christoph |
| 2019/0154470 A1* | 5/2019 | Pusheck ................. G01D 11/30 |

FOREIGN PATENT DOCUMENTS

| CN | 108303209 A | * | 7/2018 | ............. F16J 15/022 |
| CN | 109211460 B | * | 7/2021 | ............. G01L 19/00 |
| EP | 3318449 B1 | | 5/2018 | |
| KR | 20210019713 A | * | 2/2021 | |
| KR | 102413739 B1 | | 6/2022 | |

* cited by examiner

*Primary Examiner* — Robert R Raevis
(74) *Attorney, Agent, or Firm* — DICKINSON WRIGHT PLLC

(57) ABSTRACT

An apparatus includes a cover assembly, a gasket, and a housing assembly. The cover assembly generally has a hook feature and a first locking feature. The hook feature generally has a first passage in communication with an exterior of the apparatus. The gasket is generally mounted on the cover assembly and has (i) a first sealing region, (ii) a second sealing region, and (iii) a second passage in communication with the first passage. The housing assembly generally has a sealing feature, a second locking feature, and a first cavity configured to hold a sensor. The sealing feature generally mates with the first sealing region of the gasket. The sensor (a) generally seals to the second sealing region of the gasket and (b) may be in communication with the exterior of the apparatus through the first passage and the second passage. The first locking feature of the cover assembly generally cooperates with the second locking feature of the housing assembly to lock the cover assembly to the housing assembly.

20 Claims, 9 Drawing Sheets

SECTION B-B

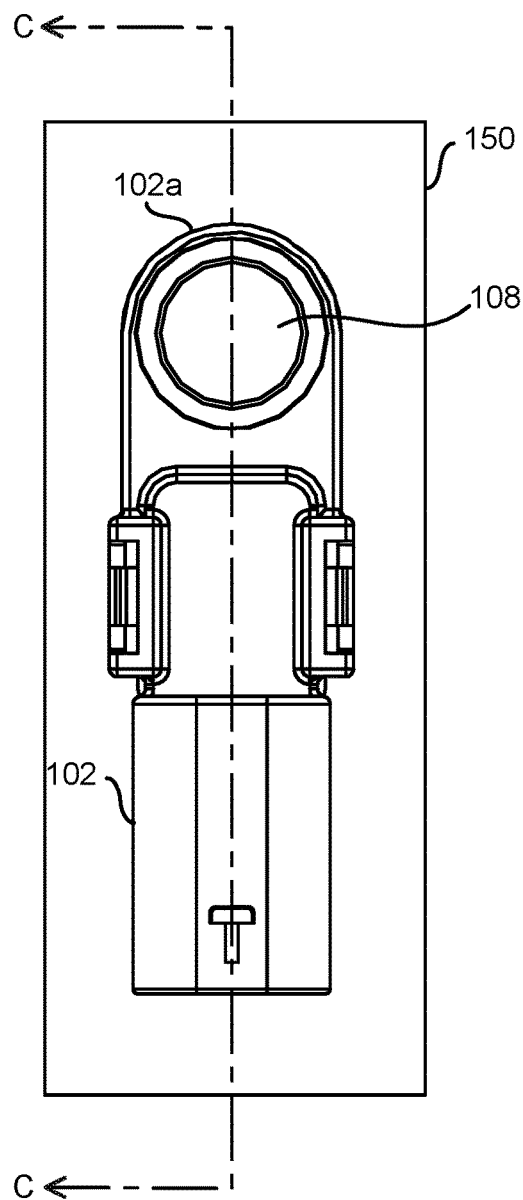
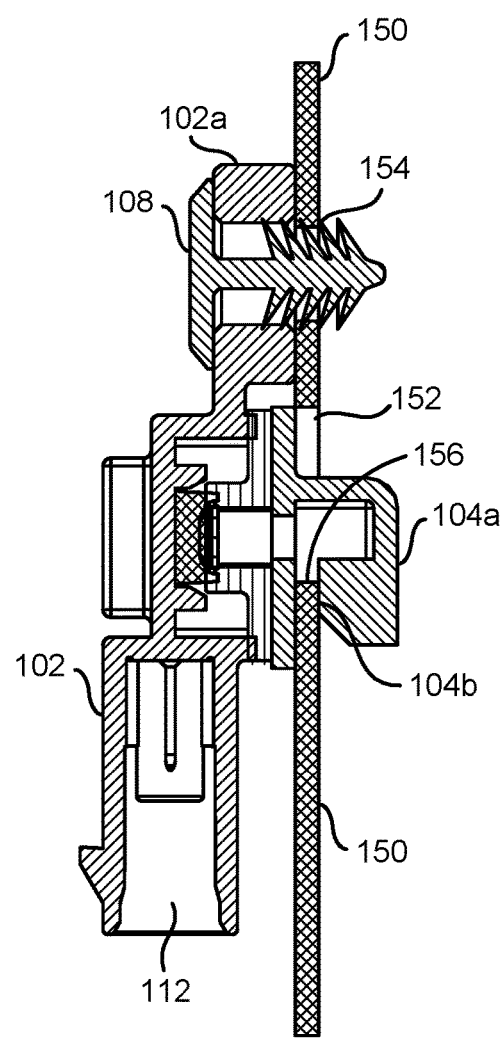
FIG. 9A
FIG. 9B
SECTION C-C

HOOK AND SNAP PRESSURE SENSOR ASSEMBLY

FIELD OF THE INVENTION

The invention relates to automotive sensor assemblies generally and, more particularly, to a method and/or apparatus for implementing a hook and snap pressure sensor assembly.

BACKGROUND

Traditional pressure sensors use metallic fasteners to attach the pressure sensor to a vehicle door. The traditional pressure sensor requires two metallic fasteners that require tooling to install the fasteners. The industry is trending towards fastener-less pressure sensor designs that require no tooling for vehicle installation (i.e., an operator can install by hand). The fastener-less concept is based on the AK-LV 29 twist lock standard. The AK-LV 29 twist lock standard compliant design requires an additional locking ring part and a larger mounting pattern for attachment to the vehicle. Overall, the AK-LV 29 twist lock standard compliant design is more expensive and requires additional packaging space.

It would be desirable to implement a hook and snap pressure sensor assembly to reduce cost and packaging.

SUMMARY

The invention concerns an apparatus including a cover assembly, a gasket, and a housing assembly. The cover assembly generally has a hook feature and a first locking feature. The hook feature generally has a first passage in communication with an exterior of the apparatus. The gasket is generally mounted on the cover assembly and has (i) a first sealing region, (ii) a second sealing region, and (iii) a second passage in communication with the first passage. The housing assembly generally has a sealing feature, a second locking feature, and a first cavity configured to hold a sensor. The sealing feature generally mates with the first sealing region of the gasket. The sensor (a) generally seals to the second sealing region of the gasket and (b) may be in communication with the exterior of the apparatus through the first passage and the second passage. The first locking feature of the cover assembly generally cooperates with the second locking feature of the housing assembly to lock the cover assembly to the housing assembly.

BRIEF DESCRIPTION OF THE FIGURES

Embodiments of the invention will be apparent from the following detailed description and the appended claims and drawings.

FIGS. 9A-9B are diagrams showing a cross-sectional view illustrating a final position of a pressure sensor module in accordance with an example embodiment of the invention attached to a body panel of a vehicle.

DETAILED DESCRIPTION OF THE EMBODIMENTS

Figure 1:
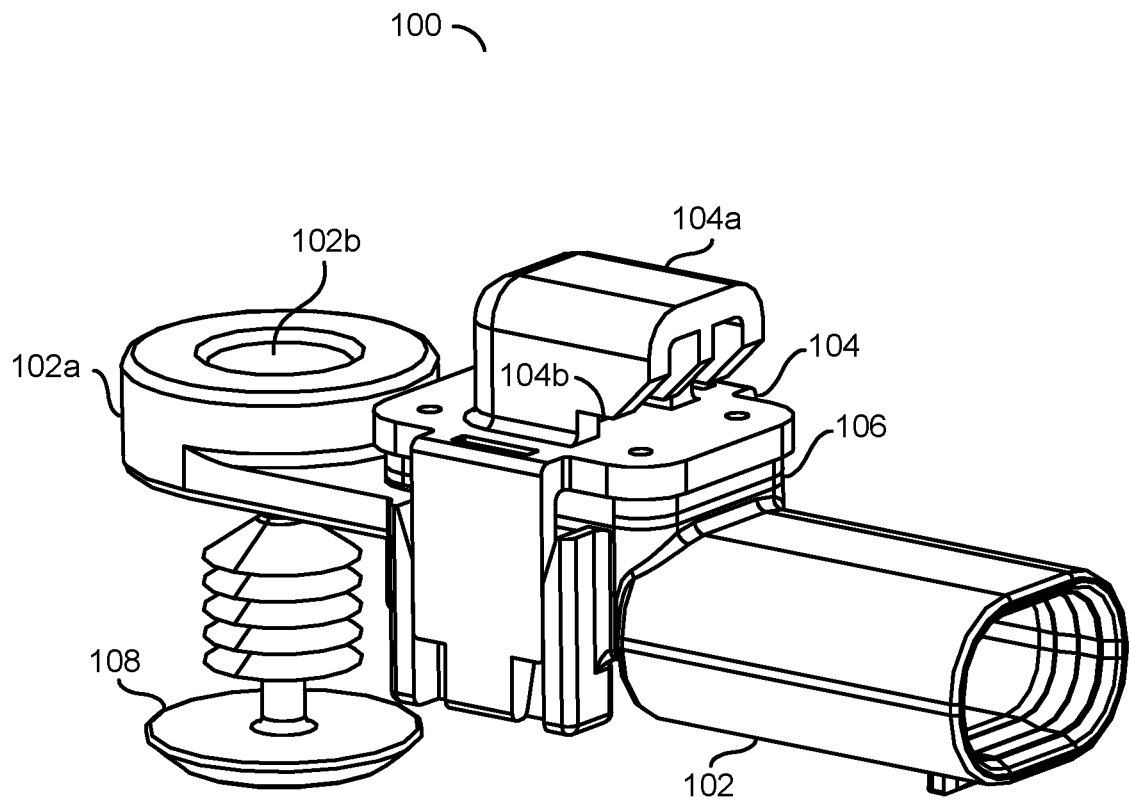
FIG. 1 is a diagram illustrating a perspective view of a pressure sensor module in accordance with an example embodiment of the invention.

Embodiments of the present invention include providing a hook and snap pressure sensor assembly that may (i) comprise a housing assembly, a cover assembly, a gasket, and a plastic fastener, (ii) include a hook feature to attach the hook and snap pressure sensor assembly to a panel of a vehicle, (iii) provide an integral pressure path to a pressure sensor device, (iv) be inexpensive to manufacture, (v) be attached to a panel of a vehicle without tooling, and/or (vi) be implemented using one or more plastic assembly fabrication techniques.

In various embodiments, a pressure sensor assembly (or module) may be provided that may use plastic fasteners that do not need tooling. In various embodiments, a pressure sensor assembly (module) is provided that comprises a housing assembly, a cover assembly, a gasket, and a plastic fastener. The cover assembly may have a snap-fit that does not need plastic joining technologies to join the cover assembly and the housing assembly together while the gasket provides an environmental seal to the housing assembly. The cover assembly generally provides a pressure port to a pressure sensor (device) that may be mounted in the housing assembly and a hook feature to attach the pressure sensor module to a vehicle panel.

In an example, the plastic fastener may be a simple push rivet that an operator may assemble easily without tools. The housing assembly may provide a first cavity (or pocket) in which a pressure sensor device (or package) may be mounted. In an example, the pressure sensor device may be a system-in-package device. In another example, the pressure sensor device may comprise a pressure sensor device soldered to a circuit board. The housing assembly may provide a second cavity that generally provides connection terminals to form electrical connections between the pressure sensor device or printed circuit board assembly and a mating connector interface to an electrical system of the vehicle. The housing assembly also provides a mounting boss having a mounting bore (or hole) through which the plastic fastener may be inserted to lock the pressure sensor module 100 to the vehicle panel, and which may be used also with a traditional metal fastener.

In various embodiments, the cover assembly generally provides a pressure path using a port feature that allows the pressure sensor device to communicate with an external environment of the pressure sensor assembly. In an example, the cover assembly may be snap-fitted to the housing assembly for an easier assembly process. In an example, the cover assembly may be over-molded on the gasket to provide a seal (e.g., an environmental seal) to the housing assembly and the pressure sensor device. In various embodiments, the pressure port geometry may be modified from tradition ports to have an undercut to allow the cover assembly to act as a hook feature that may operate to retain the pressure sensor assembly in position on a panel of the vehicle. In an example, the hook feature may provide an interference fit with an opening in the panel of the vehicle. In general, the plastic fastener acts as a final retention feature during the assembly process and is easily installed by hand. In an example, the plastic fastener (e.g., rivet) may be designed to have an interference fit to the mounting bore of the housing assembly and an opening in the panel of the vehicle. In an example, the plastic fastener may be delivered pre-assembled with the pressure sensor module (e.g., when requested by the customer).

Referring to FIG. 1, a diagram is shown illustrating a perspective view of a pressure sensor assembly (or module) 100 in accordance with an example embodiment of the invention. The pressure sensor module (or apparatus, or assembly, or unit) 100 generally implements a gas pressure sensor suitable for use in automotive applications. In an example, the pressure sensor module 100 may be used to measure an air pressure inside a vehicle. In an example, the pressure sensor module 100 may be used as a pressure side impact sensor (PSIS). In an example, the pressure sensor module 100 may be installed in a panel of a vehicle (e.g., a motor vehicle, an aircraft, a water craft, etc.). In an example, an output signal of the pressure sensor module 100 may be input to an electronic control module (ECU) of the vehicle (e.g., an airbag control unit (ACU)). In an example, deployment of a side airbag may be controlled by the ACU. In an example, the pressure sensor module 100 may mounted in doors at a side of a driver seat and a front passenger seat. At the time of a broadside collision, the pressure sensor module 100 may serve to sense a pressure change, which instantaneously occurs in the door due to deformation of the door, and transmit the sensed pressure change to the ACU.

In an example, the pressure sensor assembly (or module) 100 generally comprises a housing assembly 102, a cover assembly 104, a gasket 106, and a fastener 108. A shipping (or uninstalled) state is generally illustrated. The housing assembly 102 generally comprises a mounting boss 102*a* having a mounting bore (or hole) 102*b*. The cover assembly 104 generally comprises a hook feature 104*a* having an undercut 104*b*. The hook feature 104*a* generally acts as a hook to retain the pressure sensor assembly 100 in a mounted position on a panel of a vehicle. In various embodiments, the hook feature 104*a* is generally installed on the panel of the vehicle such that an edge of the panel is inserted in the undercut 104*b* In various embodiments, the undercut 104*b* be configured (e.g., sized or dimensioned) equal to or greater than a thickness of the panel of the vehicle onto which the pressure sensor assembly 100 is to be mounted. The housing assembly 102 is generally connected to the cover assembly 104 with the gasket 106 providing a seal between the housing assembly 102 and the cover assembly 104.

In various embodiments, the cover assembly 104 generally provides a pressure path using a port feature (or passageway) within the hook feature 104*a* and an opening in the gasket 106 that allows a sensor within the housing 102 of the pressure sensor module 100 to communicate with an external environment of the pressure sensor module 100. In an example, the cover assembly 104 may be snap-fitted to the housing assembly 102 for an easier assembly process. In an example, the gasket 106 may be over-molded on the cover assembly 104 to provide an integrated unit for an easier assembly process.

In various embodiments, a geometry of the pressure port feature of the cover assembly 104 may be modified from traditional ports to have the undercut 104*b* to form the hook feature 104*a* of the cover assembly 104, which acts as a hook to retain the pressure sensor assembly 100 in position on the panel of the vehicle. In an example, the hook feature 104*a* may be configured to provide an interference fit with an opening in the panel of the vehicle.

In an example, the fastener 108 may be implemented as a plastic fastener (or rivet) to reduce cost. In general, the fastener 108 acts as a final retention feature during an assembly process and may be easily installed without tooling (e.g., by hand). In an example, the fastener 108 may be designed to have an interference fit to the mounting bore 102*b* in the mounting boss 102*a* of the housing assembly 102 and an opening in the panel of the vehicle. In an example, the fastener 108 may be delivered pre-assembled with the pressure sensor module 100 (e.g., when requested by the customer).

Figure 2:
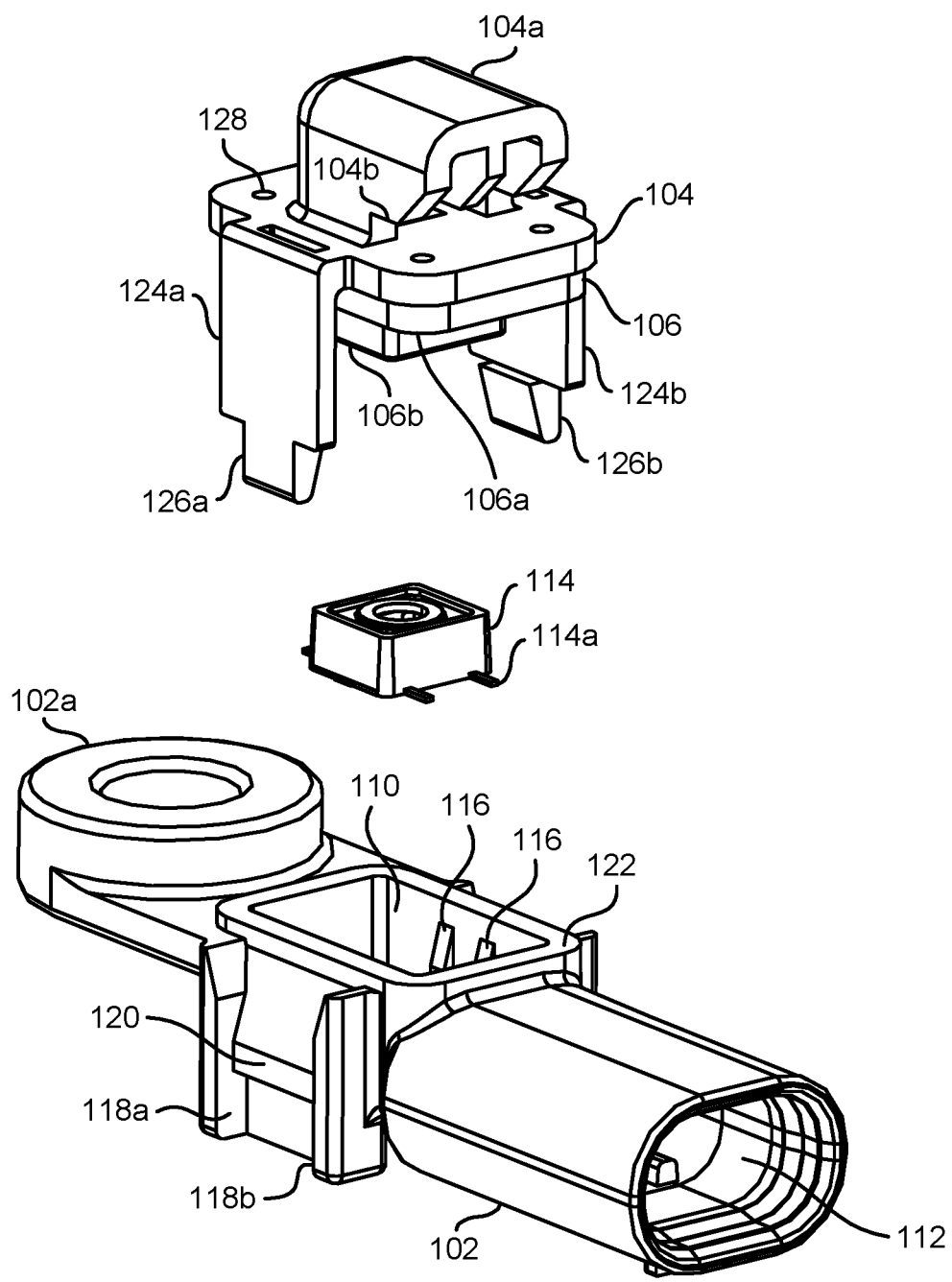
FIG. 2 is a diagram illustrating an exploded view of a pressure sensor module in accordance with an example embodiment of the invention.

Referring to FIG. 2, a diagram is shown illustrating an exploded view of the pressure sensor module 100 in accordance with an example embodiment of the invention. In an example, the housing assembly 102 may comprise a first cavity 110 and a second cavity 112. The first cavity 110 may be configured to hold a sensor package (or unit) 114. The second cavity 112 may be configured to receive an external electrical connector (not shown). The external electrical connector may be configured for connecting the pressure sensor module 100 to vehicle systems. The housing assembly 102 may be formed of a plastic material. In various embodiments, the plastic material may include, but is not limited to polyamide (NYLON), polybutylene terephthalate (PBT), polypropylene, polyethylene terephthalate (PET), acrylonitrile butadiene styrene (ABS), and/or various alloys and/or fillers of these resins. The housing assembly 102 may be formed using various techniques including, but not limited to casting, injection-molding, and three-dimensional printing. The housing assembly 102 may have a generally elongated shape. The mounting boss 102*a* may be formed at a first end of the housing assembly 102. The mounting bore 102*b* is generally configured to receive the fastener 108 for mounting the sensor module 100 to a structure (e.g., panel of a vehicle, etc.).

The first cavity 110 may be accessible through an opening (e.g., a sensor receiving opening) in a first (e.g., top) surface of the housing assembly 102. The first (sensor) cavity 110 and the sensor receiving opening providing access to the inside of the first cavity 110 are generally shaped to receive and allow manipulation of the sensor package 114. The second cavity 112 may be formed at a second (front) end of the housing assembly 102, opposite from the first end. The second cavity 112 is generally accessible through an opening in the second end of the housing assembly 102. In an example, the second end of the housing assembly 102 containing the second cavity 112 may be configured to implement a connector configured to form a sealed connection (e.g., similar to a USCAR connector 120-S-002-1-Z01 available from United States Council for Automotive Research LLC).

The first cavity 110 and the second cavity 112 are generally separated by a wall. A number of connection terminals (not visible) may have a first (sensor contact) end that extends through the wall into the first cavity 110 and a second (connector) end extending from the wall into the second cavity 112. In an example, the first ends of the connection terminals may be configured to facilitate connection (e.g., via solder deposition and reflow) to terminal pins 114a of the sensor package 114 in the first cavity 110. In another example, the first ends of the connection terminals may be configured to facilitate connection to contact pads of a sensor package placed in the first cavity 110.

In various embodiments, the first (sensor) cavity 110 may include features (e.g., a number of stops or ribs) 116. The features 116 are generally configured to guide the sensor package 114 within the sensor cavity 110 and allow the sensor package 114 to be placed into position adjacent the first (sensor contact) ends of the number of connection terminals. The features 116 may be further configured to constrain the sensor package 114 once the sensor package 114 is placed into position adjacent the connection terminals. The features 116 in the first (sensor) cavity 110 may be configured to ensure that the sensor package 114 sits flat against the first ends of the connection terminals in the first (sensor) cavity 110.

In various embodiments, the housing assembly 102 may include a set of features 118a, 118b, and 120 on each side of the housing assembly 102. The features 118a, 118b, and 120 are generally configured to guide portions of the cover assembly 104 to facilitate the snap fit connection of the cover assembly 104 to the housing assembly 102. The feature 120 may be further configured to constrain the cover assembly 104 once the cover assembly 104 is pressed into position on the housing assembly 102. The features 118a, 118b, and 120 may be configured to ensure that the cover assembly 104 and a sealing region (or surface) 106a of the gasket 106 fit tightly against a sealing feature (or surface) 122 of the housing assembly 102.

In various embodiments, the cover assembly 104 may include features 124a, 124b, 126a, and 126b. The features 124a, 124b, 126a, and 126b are generally configured to slide between the features 118a and 118b on each side of the housing assembly 102 to facilitate the snap fit connection of the cover assembly 104 to the housing assembly 102. The features 126a, and 126b may be further configured to cooperate with the features 120 to constrain the cover assembly 104 once the cover assembly 104 is pressed into position on the housing assembly 102. The features 118a, 118b, 120, 124a, 124b, 126a, and 126b may be configured to ensure that the cover assembly 104 and the gasket 106 fit tightly against the sealing surface 122 of the housing assembly 102. The features 118a, 118b, 120, 124a, 124b, 126a, and 126b generally facilitate easy assembly of the cover assembly 104 and the gasket 106 to the housing assembly 102.

In various embodiments, the gasket 106 may be overmolded on the cover assembly 104 to provide an integrated unit for an easier assembly process. In an example, the gasket 106 may comprise a thermoplastic elastomeric (TPE) material. In an example, the gasket 106 may comprise a TPE material having a Shore durometer of 30. In various embodiments, the gasket 106 may have a first sealing region (or surface) 106a and a second sealing region (or surface) 106b. The first sealing region 106a may be configured to form a seal with the sealing feature 122 of the housing assembly 102. The second sealing region 106b may be configured to form a seal with the sensor package 114. In an example, the gasket 106 may comprise a number of features 128. In an example, the features 128 may comprise posts (or towers or pins) configured to lock the gasket 106 to the cover assembly 104.

Figure 3A:
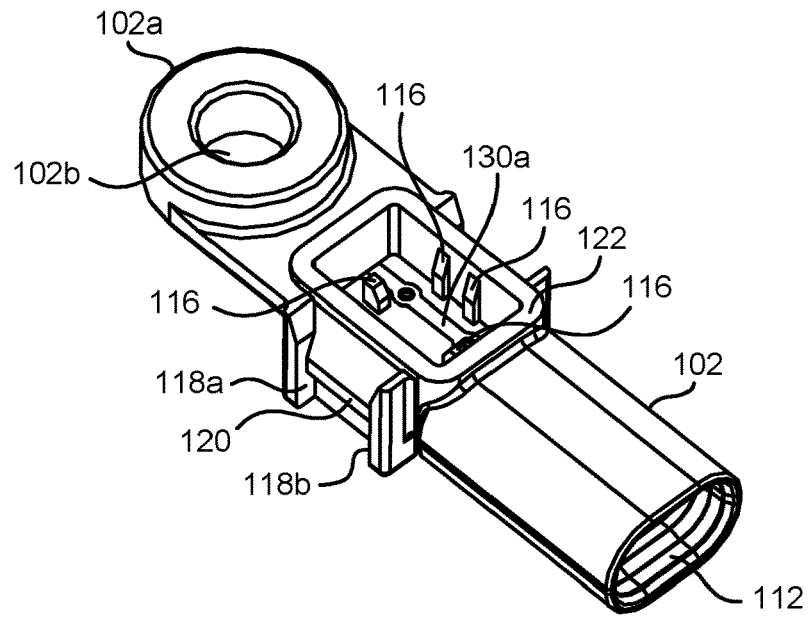
FIGS. 3A-3C are diagrams illustrating sensor package alignment features and connection terminals within a housing assembly in accordance with an example embodiment of the invention.
Figure 3B:
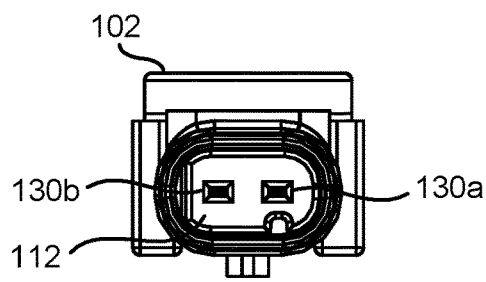
Figure 3C:
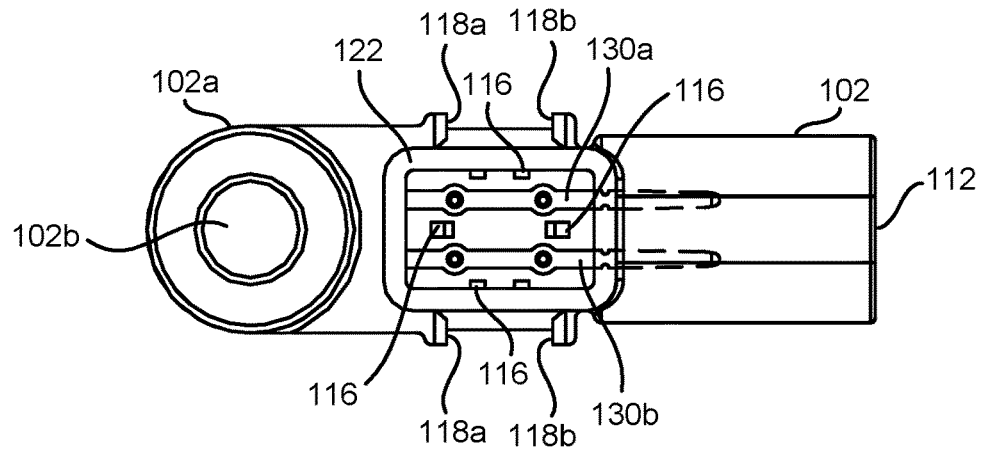

Referring to FIGS. 3A-3C, diagrams are shown illustrating sensor package alignment features and connection terminals within a housing assembly in accordance with an example embodiment of the invention. In an example, the housing assembly 102 may comprise a connection terminal 130a and a connection terminal 130b. The connection terminals 130a an 130b may have a first (sensor contact) end that extends through the wall of the housing assembly 102 into the first cavity 110 and a second (connector) end extending from the wall into the second cavity 112. The first ends may be configured to facilitate electrical connections (e.g., via solder deposition and reflow, etc.) to terminal pins 114a of the sensor package 114 in the first cavity 110. In various embodiments, the number of features 116 may be implemented to encompass a periphery of the sensor package 114. The number of features 116 are generally configured to guide the sensor package 114 into a position where terminal pins 114a of the sensor package 114 are adjacent to solder points on the first ends of the connection terminals 130a and 130b.

Figure 4A:
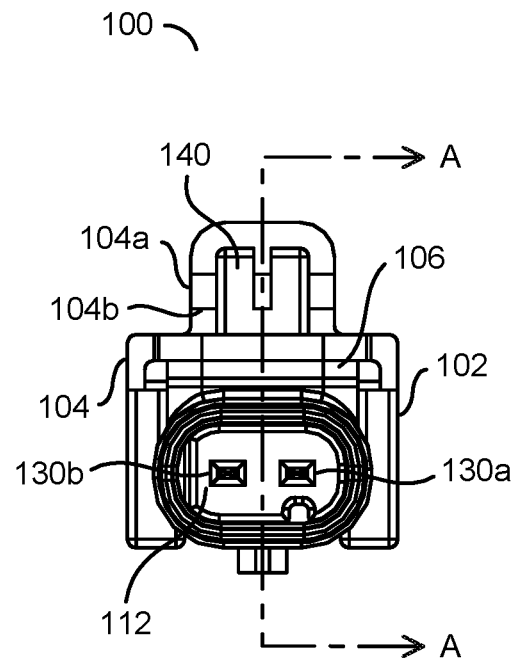
FIGS. 4A-4B are diagrams illustrating a cross-sectional view showing a pressure port of a pressure sensor module in accordance with an example embodiment of the invention.
Figure 4B:
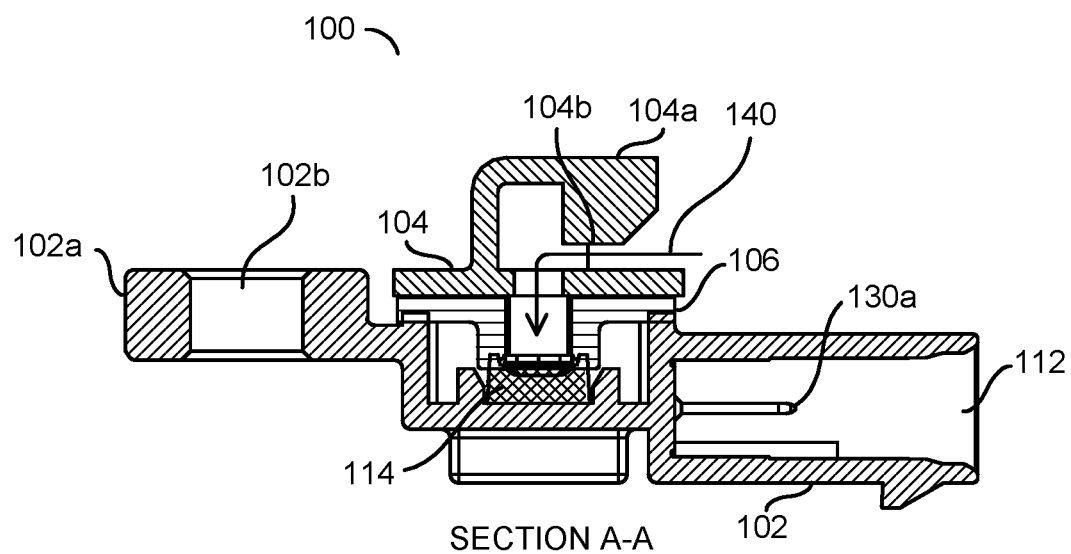

Referring to FIGS. 4A-4B, diagrams are shown of a cross-sectional view illustrating a pressure port of a pressure sensor module in accordance with an example embodiment of the invention. Referring to FIG. 4A, a section line A-A is shown indicating a view presented in FIG. 4B. The hook feature 104a of cover assembly 104 generally provides a pressure port (or path) 140 from the external environment of the pressure sensor module 100 to the pressure sensor package 114 that may be mounted in the first cavity 110 of the housing assembly 102. In various embodiments, the cover assembly 104 generally provides a pressure path 140 using a port feature that allows the pressure sensor package 114 to communicate with the external environment of the pressure sensor module 100 through a first passage 140a in the cover 104 and a second passage 140b in the gasket 106.

Figure 5A:
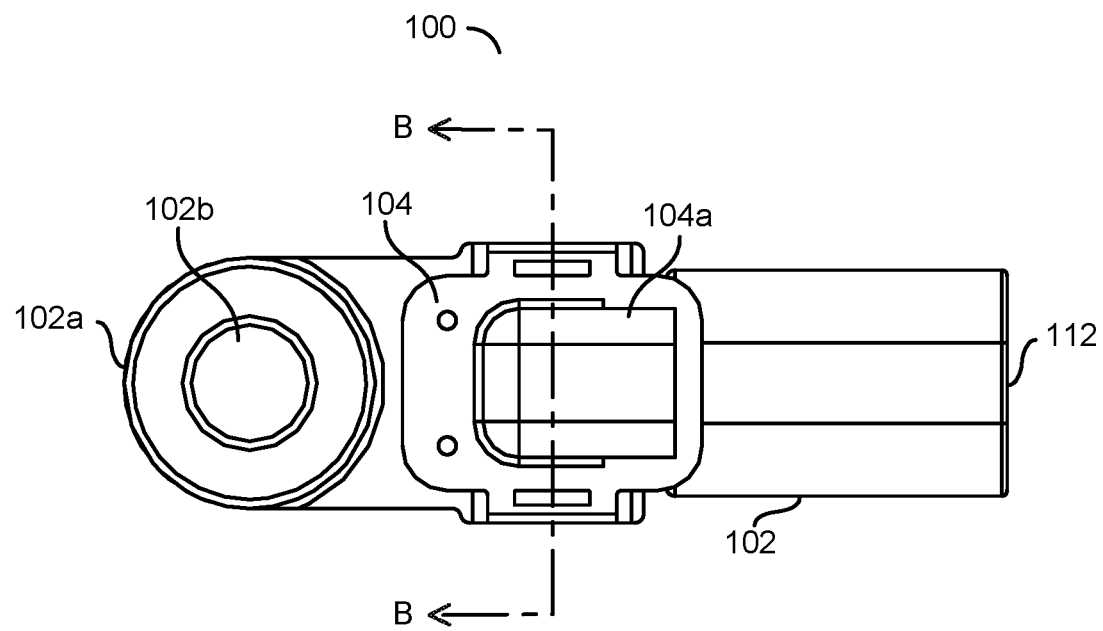
FIGS. 5A-5B are diagrams illustrating a cross-sectional view of the snap-on cover assembly and gasket connected to the housing assembly in accordance with an example embodiment of the invention.
Figure 5B:
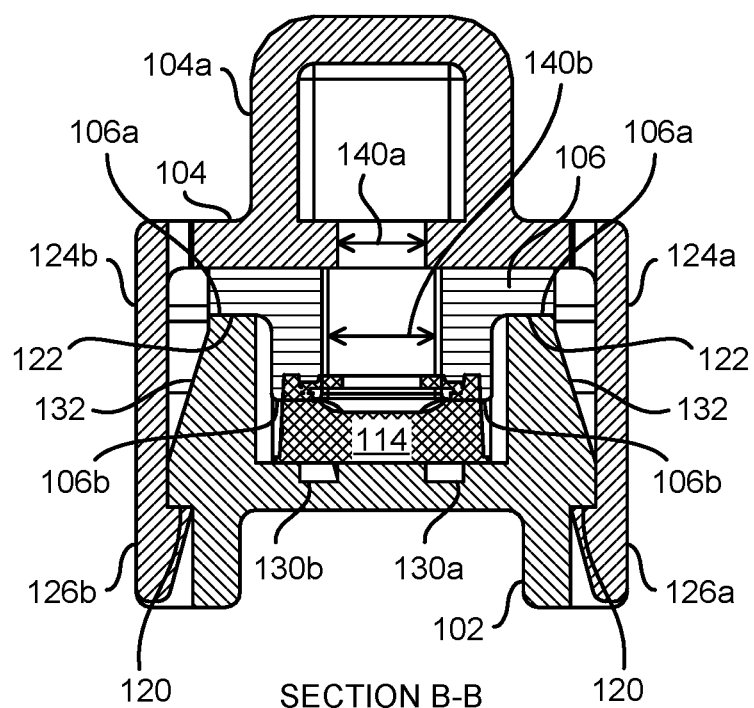

Referring to FIGS. 5A-5B, diagrams are shown illustrating cross-sectional view of a gasket and a snap-on cover of a pressure sensor module in accordance with an example embodiment of the invention. Referring to FIG. 5A, a section line B-B is shown indicating a view presented in FIG. 5B. In an example, the gasket 106 is mounted on an inner surface of the cover assembly 104. The gasket 106 generally has (i) the first sealing region (or surface) 106a that is configured to make contact with the sealing feature (or surface) 122 of the housing assembly 102, (ii) the second sealing region (or surface) 106b that is configured to make contact with a top surface of the sensor package 114, and (iii) the second passage 140b in communication with the first passage 140a in the cover assembly 104.

In an example, the features 120 of the housing assembly 102 generally comprise sloped portions 132 that interacts with the features 124a, 124b, 126a, and 126b of the cover assembly 104 to spread (or splay) the features 124a and 124b allowing the cover assembly 104 to be press fit onto the housing assembly 102. As the cover assembly 104 is pressed onto the housing assembly 102, the features 126a and 126b of the cover assembly 104 spring back toward the housing assembly 102 interlocking with the features 120 of the housing assembly and locking the cover assembly 104 onto the housing assembly 102. The features 120, 124a, 124b, 126a, and 126b are generally configured to ensure that compression of the gasket 106 is sufficient to provide a seal between the cover assembly 104, the housing assembly 102, and the sensor package 114.

Figure 6A:
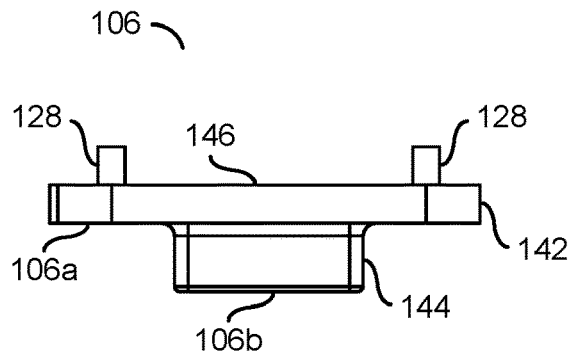
FIGS. 6A-6C are diagrams illustrating a gasket in accordance with an example embodiment of the invention.
Figure 6B:
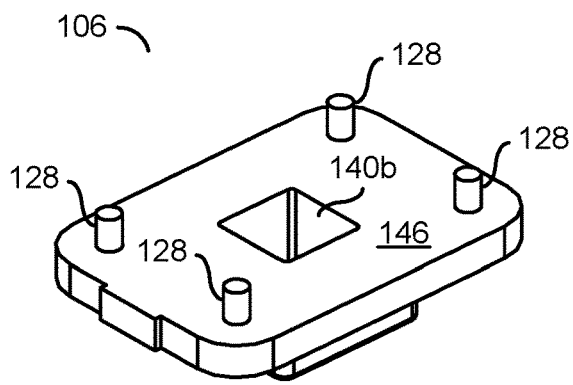
Figure 6C:
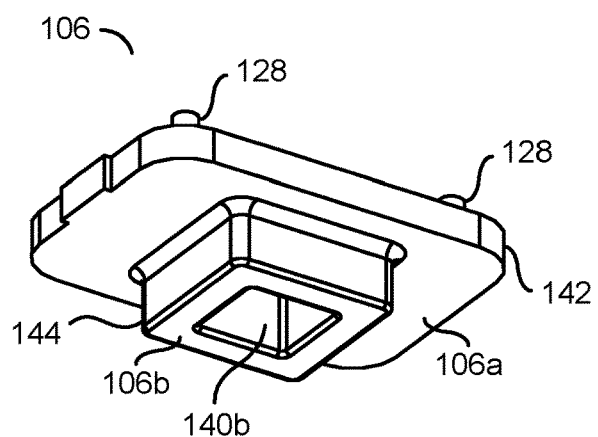

Referring to FIGS. 6A-6C, diagrams are shown illustrating a gasket in accordance with an example embodiment of the invention. In an example, the gasket 106 may comprise a base portion 142, a column portion 144, a face (or surface) 146, the first sealing region (or surface) 106a, the second sealing region (or surface) 106b, the posts (or towers) 128, and the passage (or aperture or vent) 140b. The face 146 generally abuts a surface of the cover assembly 104. The posts 128 generally extend into the cover assembly 104 holding the face 146 of the gasket 106 against the surface of the cover assembly 104. The column portion 144 is generally configured to extend into the first cavity 110 of the housing assembly 102 to allow the second sealing region (or surface) 106b of the gasket 106 to contact and form a seal with the sensor packager 114.

Figure 7A:
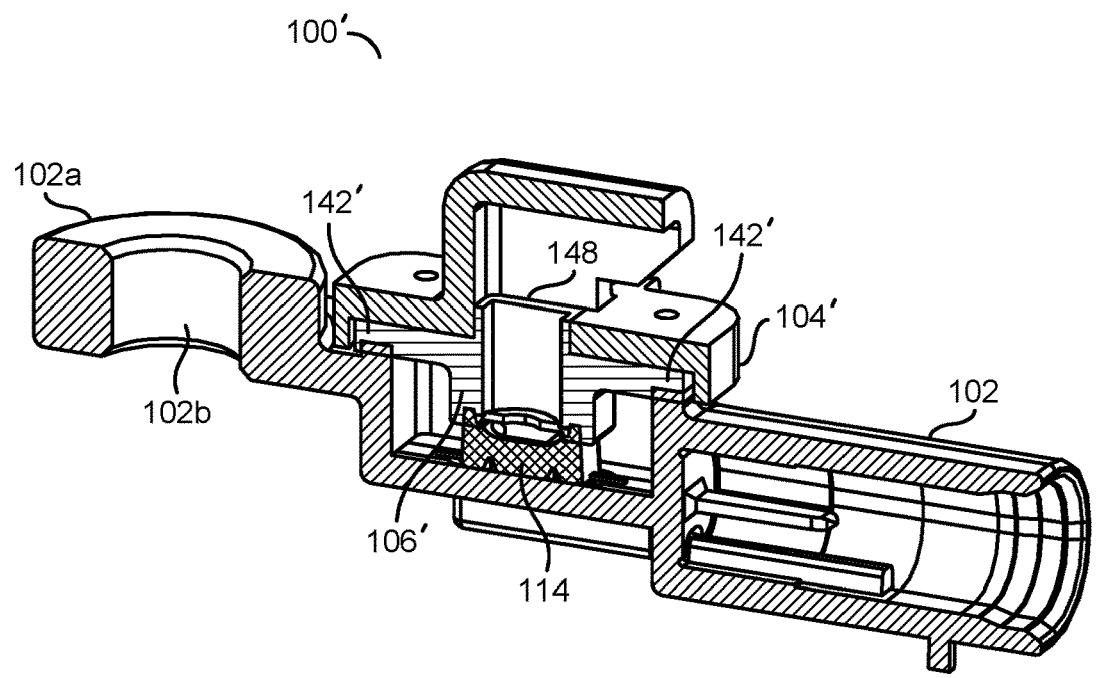
FIGS. 7A-7B are diagrams showing a cross-sectional view illustrating a pressure sensor module in accordance with another example embodiment of the invention.
Figure 7B:
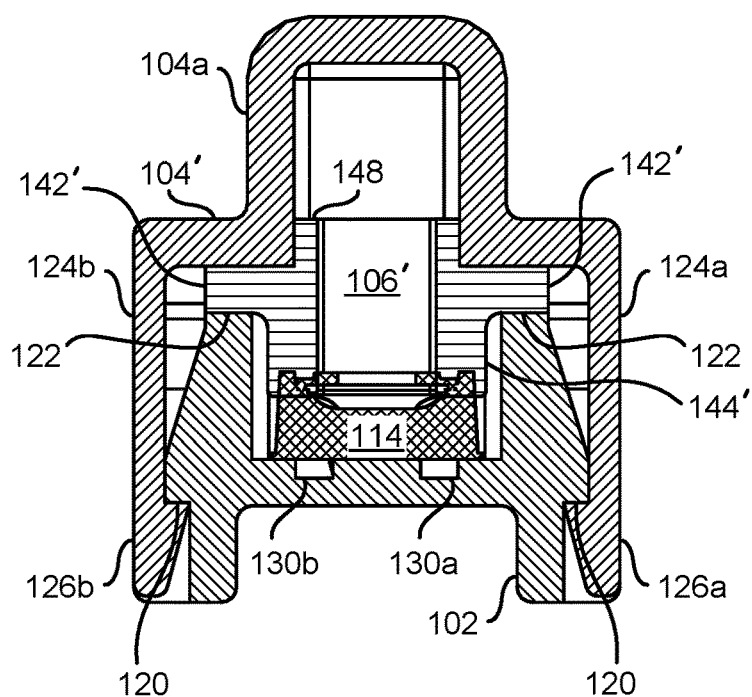
Figure 8A:
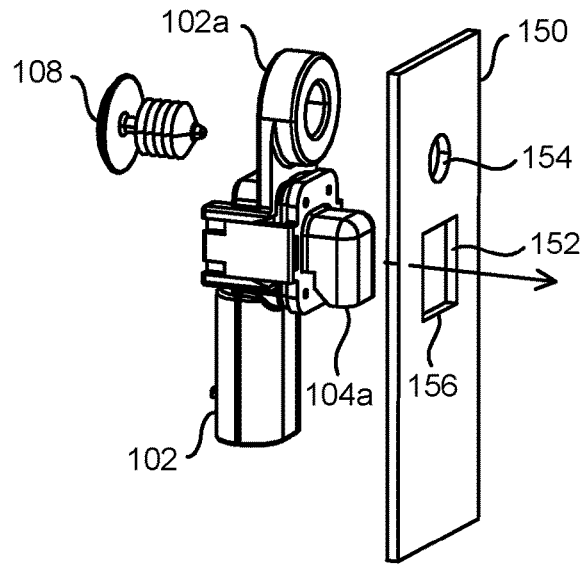
FIGS. 8A-8D are diagrams illustrating an assembly process for attaching a pressure sensor module in accordance with an example embodiment of the invention to a panel of a vehicle.
Figure 8B:
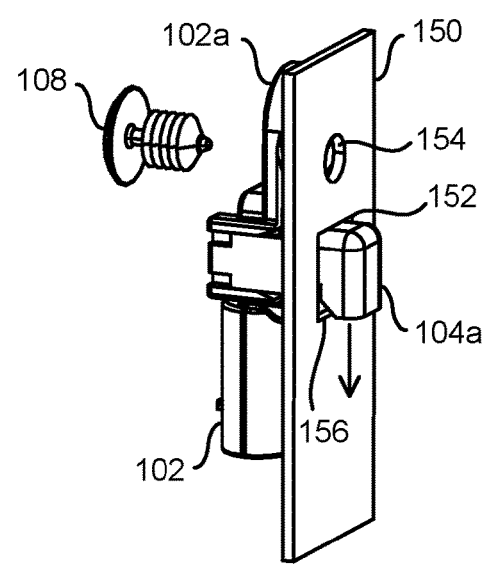
Figure 8C:
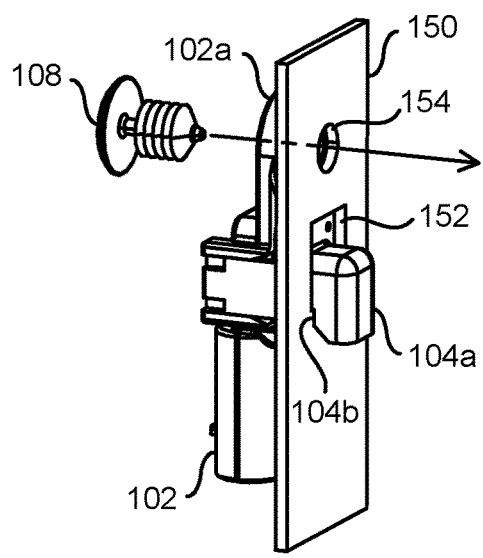
Figure 8D:
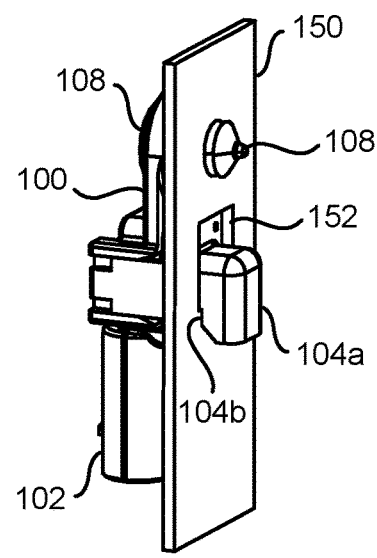

Referring to FIGS. 7A-7B, diagrams of cross-sectional views are shown illustrating a pressure sensor module 100' in accordance with another example embodiment of the invention. In an example, the pressure sensor module 100' may be implemented similarly to the pressure sensor module 100, except for a cover assembly 104' and a gasket 106'. In an example, the cover assembly 104' may be implemented similarly to the cover assembly 104 except that the cover assembly 104' may be further configured to encompass (or enclose) a base portion 142' of the gasket 106'. In an example, the gasket 106' may be implemented similarly to the gasket 106 except that the gasket 106' may further comprise a second column portion 148 that extends into the pressure path 140 of the cover assembly 104'.

Referring to FIGS. 8A-8D, diagrams are shown illustrating an assembly process for attaching a pressure sensor module in accordance with an example embodiment of the invention to a panel of a vehicle. In an example, a panel 150 of a vehicle may have an opening 152 and a hole 154 configured to facilitate mounting the pressure sensor module 100 to the panel 150. In an example, the opening 152 may be rectangular in shape. In a first step (illustrated in FIG. 8A), the hook feature 104a of the cover assembly 104 is placed through the opening 152 in the panel 150 of the vehicle. In some embodiments, the opening 152 may be configured (e.g., sized or dimensioned) to provide an interference fit with the hook feature 104a of the cover assembly 104. In a next step (illustrated in FIG. 8B), the pressure sensor module 100 may be linearly slid in a direction parallel with a long axis of the pressure sensor assembly 100 (e.g., illustrated by an arrow) to engage an edge 156 of the opening 152 within the undercut 104b of the cover assembly 104, placing the hook feature 104a into a locked position on the panel 150 and aligning the mounting bore 102b in the mounting boss 102a of the housing assembly 102 with the hole 154. In various embodiments, the long axis of the pressure sensor assembly 100 may be defined by the first end and the second end of the pressure sensor assembly 100. In a next step (e.g., illustrated in FIG. 8C), the fastener 108 is pressed through the mounting bore 102b of the mounting boss 102a of the housing assembly 102 and into the hole 154 (e.g., illustrated in FIG. 8D). The fastener 108 generally forms an interference fit with the mounting bore 102b of the mounting boss 102a of the housing assembly 102 and the hole 154.

Referring to FIGS. 9A-9B, diagrams showing a cross-sectional view illustrating a final position of a pressure sensor module in accordance with an example embodiment of the invention attached to a body panel of a vehicle are shown. Referring to FIG. 7A, a section line C-C is shown indicating a view presented in FIG. 7B. In an example, when the pressure sensor module 100 is slid into the final mounting position with the panel 150 in the undercut 104b of the cover assembly 104, the cover assembly 104 and, therefore, the pressure sensor module 100 is generally hooked onto the panel 150. With the cover assembly 104 hooked onto the panel 150, the fastener 108 is inserted through the mounting bore of the housing assembly 102 and into the hole 154 in the panel 150. With the fastener 108 inserted through the mounting bore of the housing assembly 102 and into the hole 154 in the panel 150, the pressure sensor module 100 is generally prevented from uncoupling from the panel 150.

The structures illustrated in the diagrams of FIGS. 1 to 9B may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s) The software is generally embodied in a medium or several media, for example non-transitory storage media, and may be executed by one or more of the processors sequentially or in parallel.

Data signals generated by the sensor units (or devices) may be transferred to one or more electronic control units. The electronic control units may utilize the sensor data in one or more transport vehicle functions including, but not limited to, engine control, transmission control, braking control, battery management, steering control, door control, human machine interface, seat control, speed control, restraint systems control, vehicle-to-vehicle communications and diagnostics. The electronic control units may include capabilities to adjust the sensor data to account for calibration issues, environmental factors and aging components.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:
1. An apparatus comprising:
a cover assembly having a hook and a first catch, wherein said hook defines a first passage in communication with an exterior of said apparatus;

a gasket mounted on said cover assembly and having (i) a first sealing region, (ii) a second sealing region, and (iii) a second passage in communication with said first passage, said gasket including a plurality of posts configured to extend into corresponding holes in the cover assembly for holding the gasket to the cover assembly; and a housing assembly having a sealing surface, a second catch, and a first cavity configured to hold a sensor, wherein (i) said sealing surface mates with said first sealing region of said gasket, (ii) said sensor (a) seals to said second sealing region of said gasket and (b) is in communication with said exterior of said apparatus through said first passage and said second passage, and (iii) said first catch of said cover assembly cooperates with said second catch of said housing assembly to lock said cover assembly to said housing assembly.

2. The apparatus according to claim 1, wherein said first catch of said cover assembly snap fits to said second catch of said housing assembly.

3. The apparatus according to claim 1, wherein said sealing surface of said housing assembly is configured to form an environmental seal with said first sealing region of said gasket while said housing assembly is assembled to said cover assembly.

4. The apparatus according to claim 1, wherein said sensor comprises a gas pressure sensor.

5. The apparatus according to claim 1, wherein said sensor measures an air pressure inside a vehicle.

6. The apparatus according to claim 1, wherein said apparatus comprises a pressure side impact sensor of a vehicle.

7. The apparatus according to claim 1, wherein said hook feature of said cover assembly is configured to mount said apparatus to a body panel of a vehicle.

8. The apparatus according to claim 1, wherein said hook of said cover assembly is configured to be inserted into a first opening in a body panel of a vehicle and linearly slid into a locked position.

9. The apparatus according to claim 8, wherein said hook of said cover assembly is further configured to have an interference fit with said first opening in said body panel of said vehicle.

10. The apparatus according to claim 8, further comprising a plastic fastener, wherein (i) said housing assembly further comprises a mounting boss having a mounting bore and (ii) said plastic fastener is configured to pass through said mounting bore of said housing assembly and into a second opening in said body panel of said vehicle.

11. The apparatus according to claim 10, wherein said plastic fastener is configured to have an interference fit with said mounting bore of said housing assembly and said second opening in said body panel of said vehicle.

12. The apparatus according to claim 1, wherein said housing assembly further comprises a second cavity configured to receive an external electrical connector and connect said sensor to an electrical system of a vehicle.

13. The apparatus according to claim 1, wherein said gasket is over-molded on said cover assembly.

14. An apparatus comprising:
a cover assembly having a hook and a first catch, wherein said hook is configured to protrude through an opening in a panel of a vehicle and to engage an edge of the opening, and wherein the hook defines a first passage in communication with an exterior of said apparatus;

a gasket mounted on said cover assembly and defining a second passage in communication with said first passage; and a housing assembly having a sealing surface, a second catch, and a first cavity configured to hold a sensor, wherein said gasket is disposed between and seals against said cover assembly and said sealing surface of said housing assembly, wherein said first catch of said cover assembly cooperates with said second catch of said housing assembly to lock said cover assembly to said housing assembly, and wherein said housing assembly further comprises a mounting boss having a mounting bore configured to receive a fastener therethrough for holding said hook in a fixed position protruding through the opening in the panel of the vehicle.

15. The apparatus according to claim 14, wherein said sensor comprises at least one of: a gas pressure sensor, a pressure sensor configured to measure an air pressure inside the vehicle, or a pressure side impact sensor.

16. The apparatus according to claim 14, wherein said gasket is over-molded on said cover assembly.

17. An apparatus comprising:
a cover assembly having a hook and a first catch, wherein said hook is configured to protrude through an opening in a panel of a vehicle and to engage an edge of the opening, and wherein the hook defines a first passage in communication with an exterior of said apparatus;

a housing assembly having a sealing surface, a second catch, and a first cavity configured to hold a sensor; and a gasket mounted on said cover assembly and including a base portion defining a surface and a column portion extending perpendicularly from said surface of said base portion, wherein said base portion and said column portion together define a second passage, wherein said gasket is disposed between and seals against said cover assembly and said sealing surface of said housing assembly, wherein said column portion of said gasket is configured to extend into the first cavity of the housing and to seal against the sensor, and wherein said first catch of said cover assembly cooperates with said second catch of said housing assembly to lock said cover assembly to said housing assembly.

18. The apparatus according to claim 17, wherein said sensor comprises at least one of: a gas pressure sensor, a pressure sensor configured to measure an air pressure inside the vehicle, or a pressure side impact sensor.

19. The apparatus according to claim 17, wherein said gasket includes a plurality of posts configured to extend into corresponding holes in the cover assembly for holding the gasket to the cover assembly.

20. The apparatus according to claim 17, wherein said gasket is over-molded on said cover assembly.

* * * * *